(12) United States Patent
Lada

(10) Patent No.: US 7,643,972 B2
(45) Date of Patent: Jan. 5, 2010

(54) COMPUTER-IMPLEMENTED SYSTEMS AND METHODS FOR DETERMINING STEADY-STATE CONFIDENCE INTERVALS

(75) Inventor: Emily K. Lada, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 488 days.

(21) Appl. No.: 11/635,350

(22) Filed: Dec. 7, 2006

(65) Prior Publication Data

US 2008/0140748 A1 Jun. 12, 2008

(51) Int. Cl.
G06F 17/10 (2006.01)
(52) U.S. Cl. .......................................................... 703/2
(58) Field of Classification Search .................. 703/2; 708/422; 705/1, 8–10
See application file for complete search history.

(56) References Cited

U.S. PATENT DOCUMENTS

| | | | |
|---|---|---|---|
| 6,015,667 A | 1/2000 | Sharaf | |
| 6,353,767 B1 | 3/2002 | Wakeman et al. | |
| 6,463,391 B1 | 10/2002 | Early | |
| 6,480,808 B1 | 11/2002 | Early et al. | |
| 6,560,587 B1 | 5/2003 | Early | |
| 6,625,569 B2 * | 9/2003 | James et al. | 702/183 |
| 7,080,290 B2 * | 7/2006 | James et al. | 714/47 |
| 7,092,844 B1 | 8/2006 | Young et al. | |
| 2003/0018928 A1 * | 1/2003 | James et al. | 714/25 |

OTHER PUBLICATIONS

Nakayama, M. Selecting the Best System in Steady-State Simulations Using Batch Means, Proceedings of the e1995 Winter Simulation Conference, Dec. 1995, pp. 362-366.*
Alexopoulos et al., C. To Batch or Not to Batch, Proceedings of the 2003 Winter Simulation Conference, Dec. 2003, pp. 481-489.*
Andradottir et al., S. Variance Estimation Using Replicated Batch Means, Proceedings of the 2001 Winter Simulation Conference, Dec. 2001, pp. 338-343.*
Lada, Emily Kate, "A Wavelet-Based Procedure For Steady-State Simulation Output Analysis", Ph.D. Dissertation, Graduate Program in Operations Research, North Carolina State University, Raleigh, NC, 2003 (pp. i-xvi, 1-208).
Lada, Emily K. et al., "Performance of a Wavelet-Based Spectral Procedure for Steady-State Simulation Analysis"., INFORMS Journal on Computing to appear, Submitted 2005, pp. 1-23.
Lada, Emily K. et al., "A wavelet-based spectral procedure for steady-state simulation analysis", European Journal of Operational Research 174, Nov. 2006, pp. 1769-1801.
Steiger, Natalie M. et al. "ASAP3: A Batch Means Procedure for Steady-State Simulation Analysis", ACM Transactions on Modeling and Computer Simulation, vol. 15, No. 1, Jan. 2005, pp. 39-73.

* cited by examiner

Primary Examiner—Russell Frejd
(74) Attorney, Agent, or Firm—Jones Day

(57) ABSTRACT

Computer-implemented systems and methods for estimating confidence intervals for output generated from a computer simulation program that simulates a physical stochastic process. A plurality of statistical tests is performed upon the physical stochastic simulated output so that a confidence interval can be determined.

20 Claims, 14 Drawing Sheets

```
Inputs From User:
Precision Level: 15%
Confidence Level: 10% (generating nominal 90% confidence interval
Data File: MM1.dat Starting SBatch...
Initial Data Size: 16384
Initial Number of Batches: 1024
Initial Batch Size: 16

Independence Test Failed...
Independence Test Failed...
Independence Test Failed...
Number of batches in final spacer: 3
Batchsize after independence test: 16
Total number of observations separating each batch mean: 48
Number of observations to ignore for warm-up period: the first 48
Total observations required after independence test: 16384
Number of spaced batch means going into normality test: 256

Normality test failed at the 0.05 level
  generating more MM1 data in normality test...
Normality test failed at the 0.04158822213509427 level
  generating more MM1 data in normality test...
Normality test failed at the 0.02393158190922749 level
  generating more MM1 data in normality test...
Normality test failed at the 0.009527372824561049 level
  generating more MM1 data in normality test...
Normality test failed at the 0.002624071201906986 level
  generating more MM1 data in normality test...
Normality test failed at the 5.00010093095149E-4 level
  generating more MM1 data in normality test...
Normality test failed at the 6.591475289833419E-5 level
  generating more MM1 data in normality test...
Normality test failed at the 6.011560012968353E-6 level
  generating more MM1 data in normality test...
```

FIG. 8A

```
...

Normality test failed at the 3.7930838819753784E-7 level
generating more MM1 data in normality test...
Normality test failed at the 1.6557638951378405E-8 level
generating more MM1 data in normality test...
Normality test failed at the 5.000403736061229E-10 level
generating more MM1 data in normality test...
Normality test failed at the 1.044750132719431B8E-11 level
generating more MM1 data in normality test...
Normality test failed at the 1.5101514372513495E-13 level
generating more MM1 data in normality test...
Normality test failed at the 1.5101819214579564E-15 level
generating more MM1 data in normality test...
Normality test failed at the 1.0448134025763697E-17 level
generating more MM1 data in normality test...
Normality test failed at the 5.0009084519826055E-20 level
generating more MM1 data in normality test...
Normality test failed at the 1.6559978742801835E-22 level
generating more MM1 data in normality test...
Normality test failed at the 3.7937730488899388E-25 level
generating more MM1 data in normality test...
Normality test failed at the 6.012895003244744E-28 level
generating more MM1 data in normality test...
Batchsize after normality test: 296
Number of batches after normality test: 256
Total observations required after normality test: 88064

Correlation Test Failed...
generating more MM1 data in correlation test...
Batchsize after correlation test: 325
Number of batches after correlation test: 256
Total observations required after correlation test: 95488

Precision Test PASSED
CI Half Width: 0.14801263989855626
Final Confidence Interval: (2.9630287051007426, 3.2590539849004539)
Final Data Size: 95488.0
```

FIG. 8B

| | | | | | |
|---|---|---|---|---|---|
| 0 | | | | | |
| 0.8657643 | | | | | |
| 3.0195707 | | | | | |
| 2.6800928 | | | | | |
| 2.4671232 | | | | | |
| 2.8462186 | | | | | |
| 2.3137011 | | | | | |
| 2.4075563 | | | | | |
| 0.6737582 | | | | | |
| 0.7048053 | | | | | |
| 1.7771083 | | | | | |
| 1.9199059 | | | | | |
| 2.8563104 | | | | | |
| 2.8150472 | | | | | |
| 1.812947 | | | | | |
| 1.3589569 | | | | | |
| 1.5934696 | | | | | |
| 0.2892376 | | | | | |
| 0 | | | | | |
| 0.1179583 | | | | | |
| 0 | | | | | |
| 0 | | | | | |
| 0 | | | | | |
| 0.3485735 | | | | | |
| 0.3734326 | | | | | |
| 1.1660046 | | | | | |
| 1.046433 | | | | | |
| 0 | | | | | |
| 0 | | | | | |
| 0 | | | | | |
| 0.6225299 | | | | | |
| 0.1603927 | | | | | |
| 1.640575 | | | | | |
| 1.2787166 | | | | | |
| 1.5701236 | | | | | |
| 1.4173432 | | | | | |
| 1.2169281 | | | | | |
| 0.5503078 | | | | | |
| 1.8559325 | | | | | |
| 1.9902317 | | | | | |
| 2.5926544 | | | | | |
| 2.7224234 | | | | | |
| 2.949025 | | | | | |
| 3.9645078 | | | | | |
| 4.4418414 | | | | | |
| 4.8588286 | | | | | |
| 3.8840155 | | | | | |
| 4.2653144 | *** End of First Spacer and Cut-off Point for Warm-Up Period *** | | | | |

. . .

. . .

| | | | | | |
|---|---|---|---|---|---|
| 4.1987149 | | | | | |
| 3.9339067 | | | | | |
| 4.4036978 | | | | | |
| 4.3197237 | | | | | |
| 3.7333609 | | | | | |
| 3.2380935 | | | | | |
| 3.9806926 | | | | | |
| 3.3017111 | | | | | |
| 3.3731084 | | | | | |
| 2.4967787 | | | | | |
| 2.8896927 | | | | | |
| 3.5822116 | | | | | |
| 1.2291526 | | | | | |
| 0.7314778 | | | | | |
| 1.999306 | | | | | |
| 3.0393515 | End of Batch 4: Batch mean = | | 3.1531863 | | |
| 1.8471173 | *** Beginning of Second Spacer *** | | | | |
| 1.9975558 | | | | | |
| 0 | | | | | |
| 0.8500939 | | | | | |
| 1.522589 | | | | | |
| 1.263426 | | | | | |
| 0.7869553 | | | | | |
| 1.3487528 | | | | | |
| 1.14055 | | | | | |
| 2.4156981 | | | | | |
| 1.5774548 | | | | | |
| 2.0345575 | | | | | |
| 1.9096342 | | | | | |
| 1.3272369 | | | | | |
| 1.9410591 | | | | | |
| 2.4007352 | | | | | |
| 4.3907373 | | | | | |
| 4.1842084 | | | | | |
| 3.5884996 | | | | | |
| 2.7619728 | | | | | |
| 0.5658342 | | | | | |
| 0 | | | | | |
| 0 | | | | | |
| 0 | | | | | |
| 1.6546887 | | | | | |
| 1.713156 | | | | | |
| 0.7304166 | | | | | |
| 0.5668266 | | | | | |
| 2.7457142 | | | | | |
| 1.9630067 | | | | | |
| 2.6024487 | | | | | |
| 1.6598047 | | | | | |
| 1.6253556 | | | | | |
| 0.883275 | | | | | |
| 1.8465107 | | | | | |
| 0 | | | | | |
| 0.0245526 | | | | | |
| 0 | | | | | |
| 0 | | | | | |
| 0.8003423 | | | | | |
| 0 | | | | | |
| 1.7465459 | | | | | |
| 1.647585 | | | | | |
| 2.9937457 | | | | | |
| 4.0939176 | | | | | |
| 4.8731898 | | | | | |
| 4.9877966 | | | | | |
| 5.1777234 | *** End of Second Spacer *** | | | | |

600

. . .

. . .

| | | | | | | |
|---|---|---|---|---|---|---|
| 4.3059664 | | | | | | |
| 3.8483868 | | | | | | |
| 3.2223639 | | | | | | |
| 5.258828 | | | | | | |
| 4.4084799 | | | | | | |
| 5.5513018 | | | | | | |
| 8.7203299 | | | | | | |
| 7.7783772 | | | | | | |
| 7.4729451 | | | | | | |
| 7.7805798 | | | | | | |
| 6.1167564 | | | | | | |
| 4.4448764 | | | | | | |
| 1.7458773 | | | | | | |
| 2.199573 | | | | | | |
| 2.3405 | | | | | | |
| 2.6470828 | End of Batch 8: Batch mean = | | 4.865139 | | | |
| 2.391267 | *** Beginning of Third Spacer *** | | | | | |
| 1.0722991 | | | | | | |
| 0.4839957 | | | | | | |
| 0.0999025 | | | | | | |
| 2.1229593 | | | | | | |
| 2.0665162 | | | | | | |
| 2.1516893 | | | | | | |
| 1.1098946 | | | | | | |
| 0 | | | | | | |
| 0 | | | | | | |
| 0.6039959 | | | | | | |
| 2.4029002 | | | | | | |
| 3.3750692 | | | | | | |
| 1.4126834 | | | | | | |
| 0.4999999 | | | | | | |
| 1.6369788 | | | | | | |
| 1.7766526 | | | | | | |
| 3.308398 | | | | | | |
| 2.5908365 | | | | | | |
| 2.3115936 | | | | | | |
| 0 | | | | | | |
| 0 | | | | | | |
| 0.1805694 | | | | | | |
| 0.140448 | | | | | | |
| 0 | | | | | | |
| 3.9650898 | | | | | | |
| 2.1486389 | | | | | | |
| 2.5356242 | | | | | | |
| 2.4115184 | | | | | | |
| 2.0905861 | | | | | | |
| 1.6476018 | | | | | | |
| 0 | | | | | | |
| 0.2386857 | | | | | | |
| 0.3873008 | | | | | | |
| 0.3962299 | | | | | | |
| 0.1875948 | | | | | | |
| 0 | | | | | | |
| 0 | | | | | | |
| 0.3367556 | | | | | | |
| 0 | | | | | | |
| 0 | | | | | | |
| 0 | | | | | | |
| 0.3186115 | | | | | | |
| 0 | | | | | | |
| 0 | | | | | | |
| 0 | | | | | | |
| 1.3562743 | *** End of Third Spacer *** | | | | | |

600

. . .

...

| | | | | | |
|---|---|---|---|---|---|
| 1.4441984 | | | | | |
| 1.8909774 | | | | | |
| 1.9517496 | | | | | |
| 1.6220769 | | | | | |
| 1.6949475 | | | | | |
| 1.7717029 | | | | | |
| 2.2019514 | | | | | |
| 1.9949506 | | | | | |
| 2.2590098 | | | | | |
| 1.6104595 | | | | | |
| 1.5744806 | | | | | |
| 2.1546165 | | | | | |
| 3.3006985 | | | | | |
| 2.8249843 | | | | | |
| 2.4619483 | | | | | |
| 3.5684971 | End of Batch 12: Batch mean = | | 2.1454531 | | |

COMPUTER-IMPLEMENTED SYSTEMS AND METHODS FOR DETERMINING STEADY-STATE CONFIDENCE INTERVALS

TECHNICAL FIELD

This document relates generally to computer-implemented statistical analysis and more particularly to computer-implemented systems for determining steady-state confidence intervals.

BACKGROUND

Steady-state computer simulations can provide insight into how physical stochastic processes operate. Any insight gained through such computer simulations is valuable because stochastic processes abound within commercial industries (e.g., assessment of long-run average performance measures associated with operating an automotive assembly line) as well as other industries (e.g., financial industries with the ever varying fluctuations of stock and bond prices). Complicated statistical issues can arise when attempting to analyze stochastic output that has been generated from a steady-state simulation. As an illustration, a difficulty can arise as to how to provide statistically valid confidence intervals for the steady-state mean (or other statistic) of the simulation's output.

SUMMARY

In accordance with the teachings provided herein, systems and methods for operation upon data processing devices are provided for estimating confidence intervals for output generated from a computer simulation program that simulates a physical stochastic process. From the computer simulation program, output is received that simulates the physical stochastic process. A plurality of statistical tests is performed upon the physical stochastic simulated output so that a confidence interval can be determined.

As another example, a system and method can be configured to receive, from the computer simulation program, output that simulates the physical stochastic process. Spaced batch means can be computed for the physical stochastic simulated output. A plurality of statistical tests can be applied upon the physical stochastic simulated output, wherein the plurality of statistical tests includes a test for correlation of the physical stochastic simulated output. Batch size associated with the physical stochastic simulated output is increased if the test for correlation of the physical stochastic simulated output fails. The increased batch size is used in determining a confidence interval for the physical stochastic simulated output. The determined confidence interval is provided for analysis of the physical stochastic process.

BRIEF DESCRIPTION OF THE DRAWINGS

FIGS. 8A and 8B depict processing results from applying a plurality of statistical tests upon sample input data.

DETAILED DESCRIPTION

Figure 1:
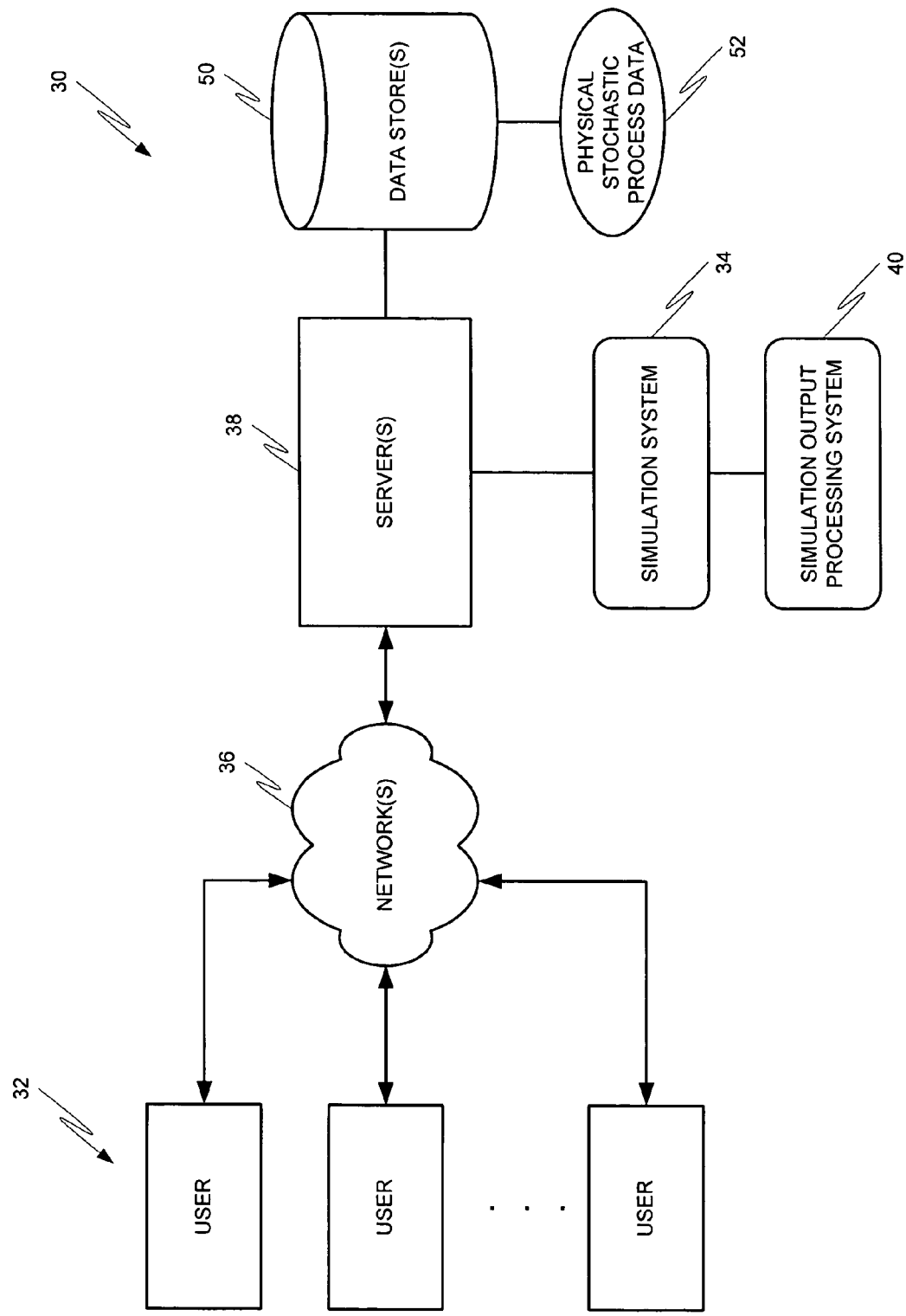
FIG. 1 is a block diagram depicting software and computer components utilized in a simulation output processing system.

FIG. 1 depicts at 30 an environment wherein users 32 can interact with a steady-state simulation system 34 to analyze data associated with a physical stochastic process. A simulation system 34 can analyze a wide range of physical processes that are characterized by randomness or whose behavior is non-deterministic in that the next state of the environment is partially but not fully determined by the previous state of the environment. Many different types of simulation systems can be used, such as the SAS Simulation Studio which contains a discrete event simulation program and is available from SAS Institute, Inc., in Cary, N.C.

The users 32 can interact with the simulation system 34 through a number of ways, such as over one or more networks 36. A server 38 accessible through the network(s) 36 can host the simulation system 34. The simulation system 34 can be an integrated web-based reporting and analysis tool that provides users flexibility and functionality for analyzing physical stochastic processes.

The simulation system 34 can be used separately or in conjunction with a simulation output processing system 40. The simulation output processing system 40 processes output data from the simulation system 34. This processing can include determining point and confidence interval estimators for one or more parameters of the steady-state output, such as a cumulative distribution function of a particular simulation-generated response (e.g., steady-state mean).

The simulation output processing system 40 can exist as a sub-module of the simulation system 34 or may exist as its own separate program. The simulation output processing system 40 may reside on the same server (e.g., computer) as a simulation system 34 or may reside on a different server.

Data store(s) 50 can store any or all of the data 52 that is associated with the operation of the simulation system 34 and/or the simulation output processing system 40. This data can include not only the input and output data for the simulation system 34 and the simulation output processing system 40, but also may include any intermediate data calculations and data results.

Figure 2:
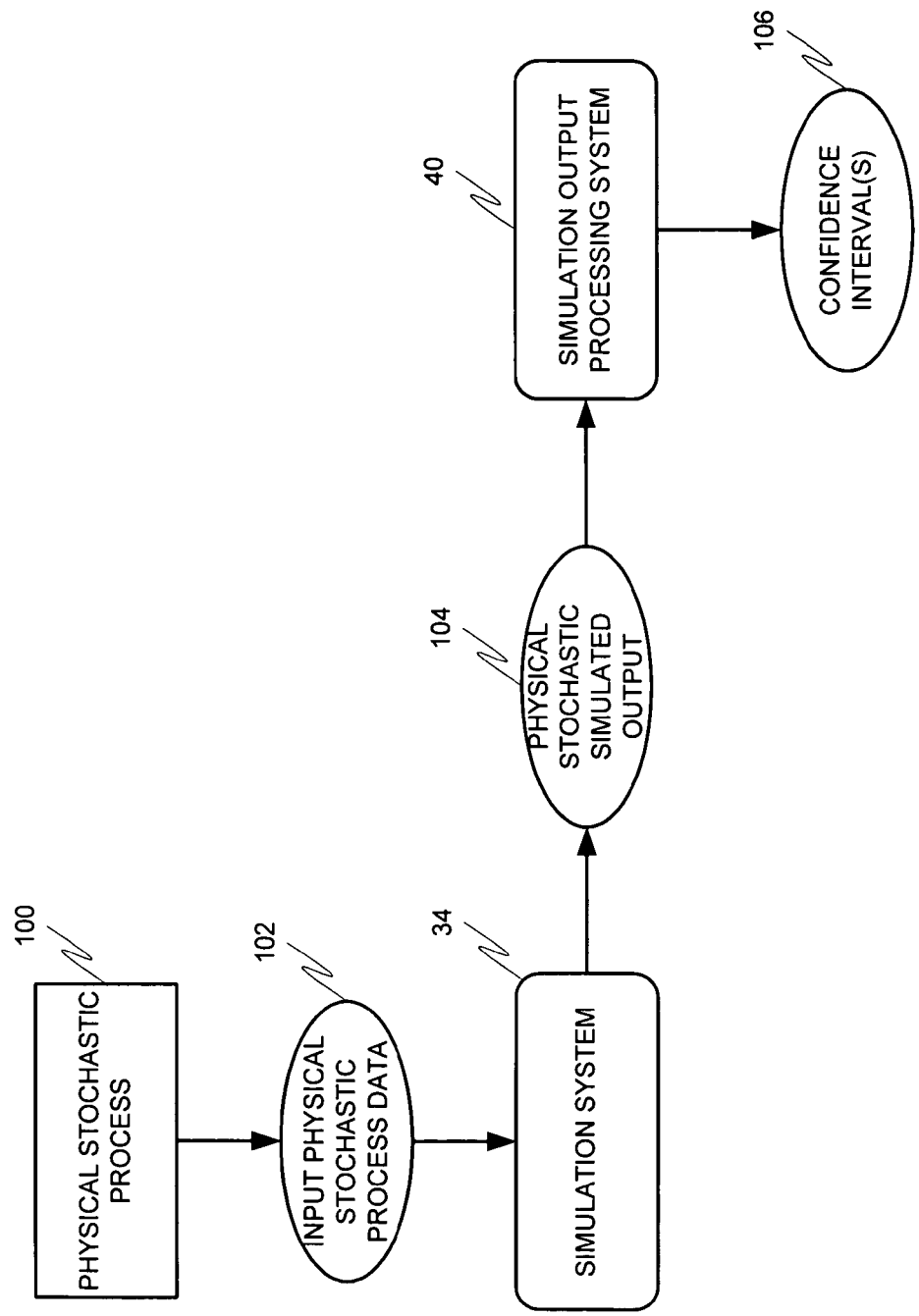
FIG. 2 is a block diagram depicting generation of confidence intervals.

FIG. 2 depicts a process flow involving the simulation output processing system 40. In the process flow, the simulation system 34 receives input physical stochastic process data 102 that is indicative of one or more attributes associated with a physical stochastic process 100.

Based upon the input data 102, the simulation system 34 determines averages, variability, patterns, trends, etc. Physical stochastic simulated output 104 is generated by the simulation system 34 through use of the input data 102. The simulation output processing system 40 then analyzes the output data 104 in order to determine valid confidence intervals 106 for one or more parameters of the steady-state simulated output 104.

Figure 3:
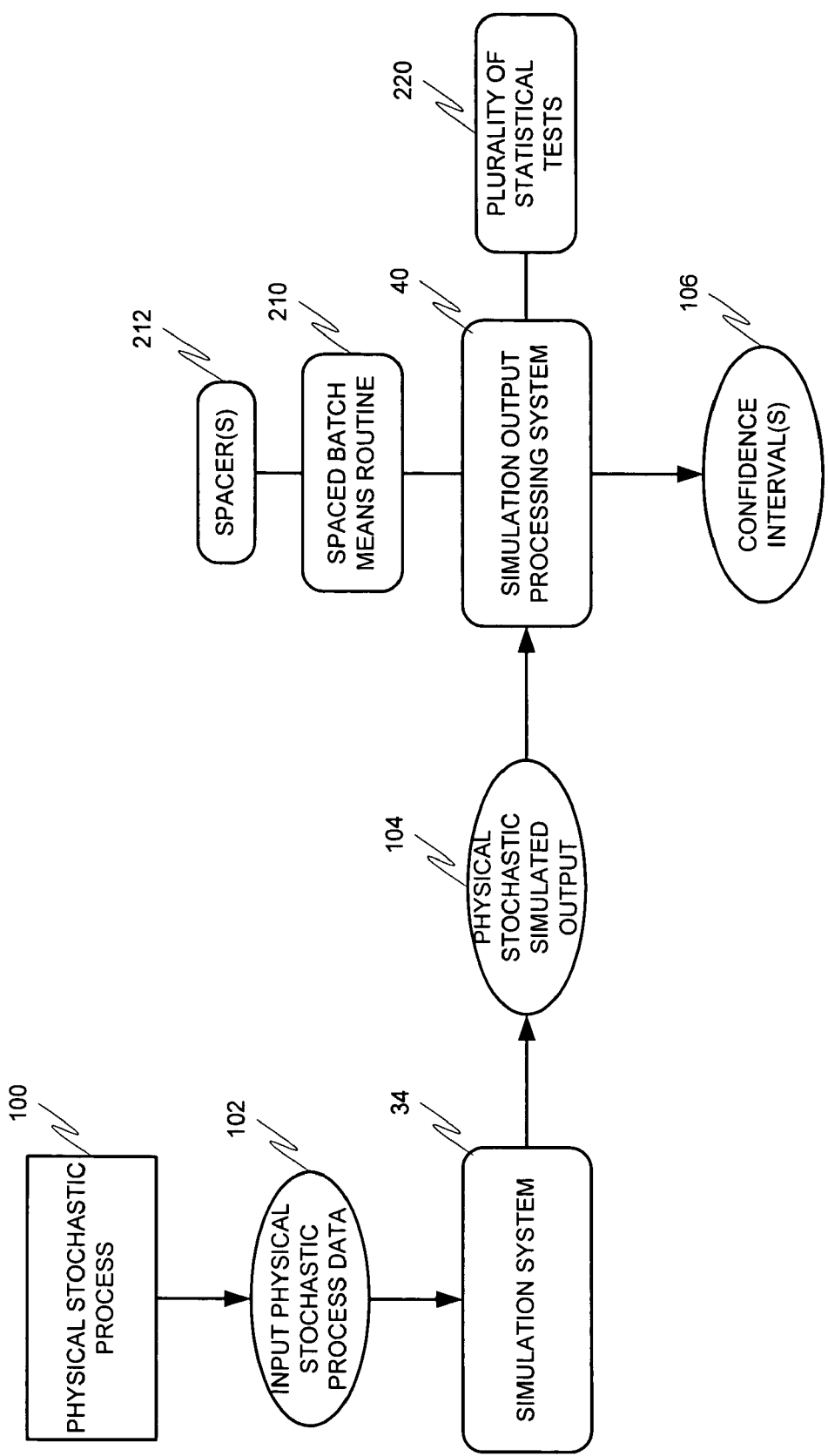
FIG. 3 is a block diagram depicting use of a spaced batch means routine and a plurality of statistical tests for generating confidence intervals.

FIG. 3 illustrates that the simulation output processing system 40 can use a spaced batch means routine 210 in order to determine the confidence intervals 106. More specifically, a spaced batch means routine 210 determines the size of a spacer 212 (consisting of ignored observations) preceding each batch that is sufficiently large to ensure the resulting spaced batch means are approximately independent.

Figure 4:
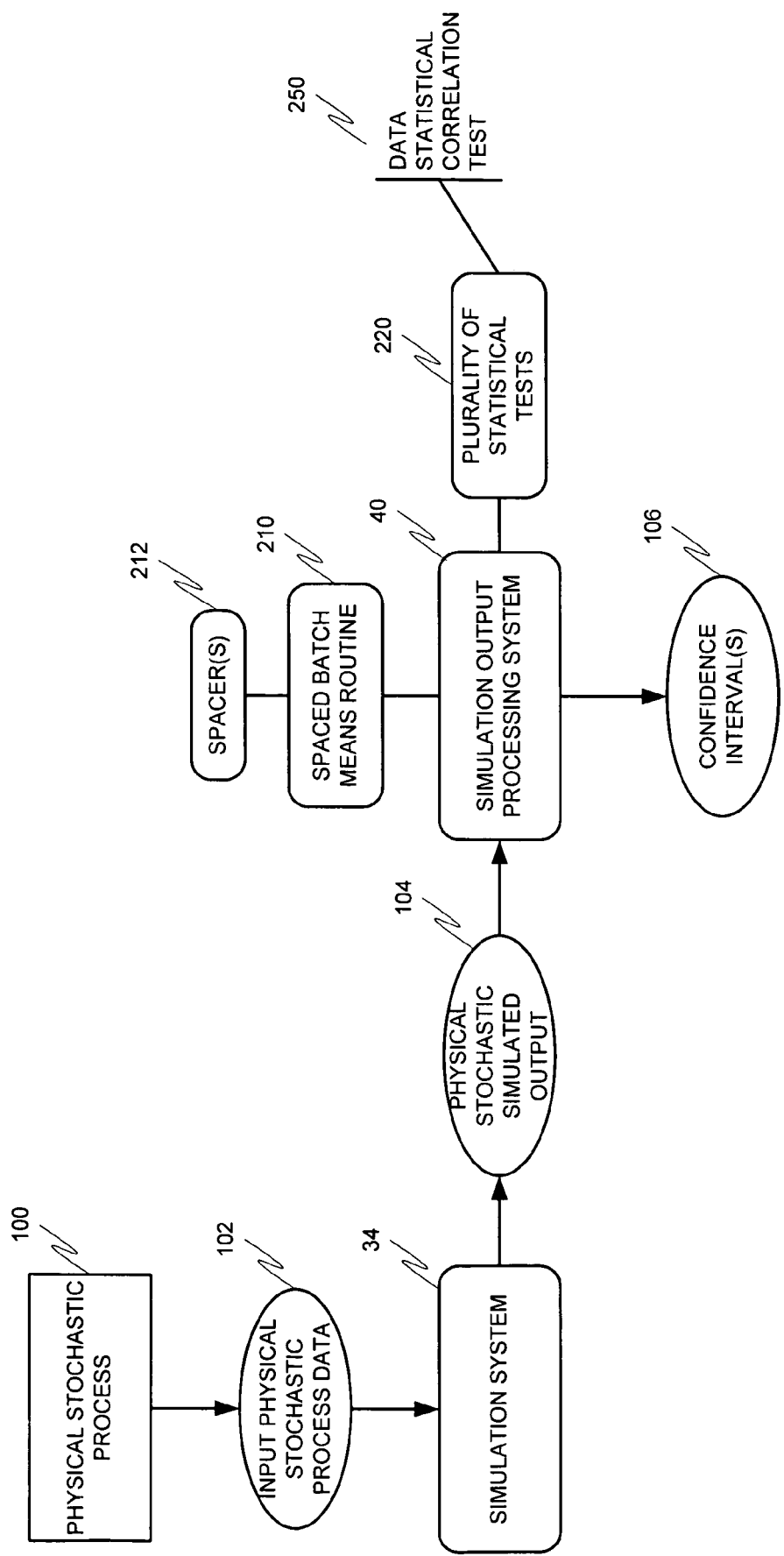
FIGS. 4 and 5 are block diagrams depicting examples of statistical tests that can be utilized in generating confidence intervals.

The simulation output processing system 40 can also utilize a plurality of statistical tests 220 in order to determine the confidence intervals 106, such as the statistical test shown in FIG. 4. With reference to FIG. 4, a data statistical correlation test 250 can be one of a number of statistical tests that are used by the simulation output processing system 40 for generating valid confidence intervals 106. The data statistical correlation test 250 can be used to improve the integrity of the generated confidence intervals 106 by assessing whether there are excessive dependencies in the output data. If so, then adjustments are made (e.g., to the spaced batch size) until the data statistical correlation test 250 has been satisfied.

Figure 5:
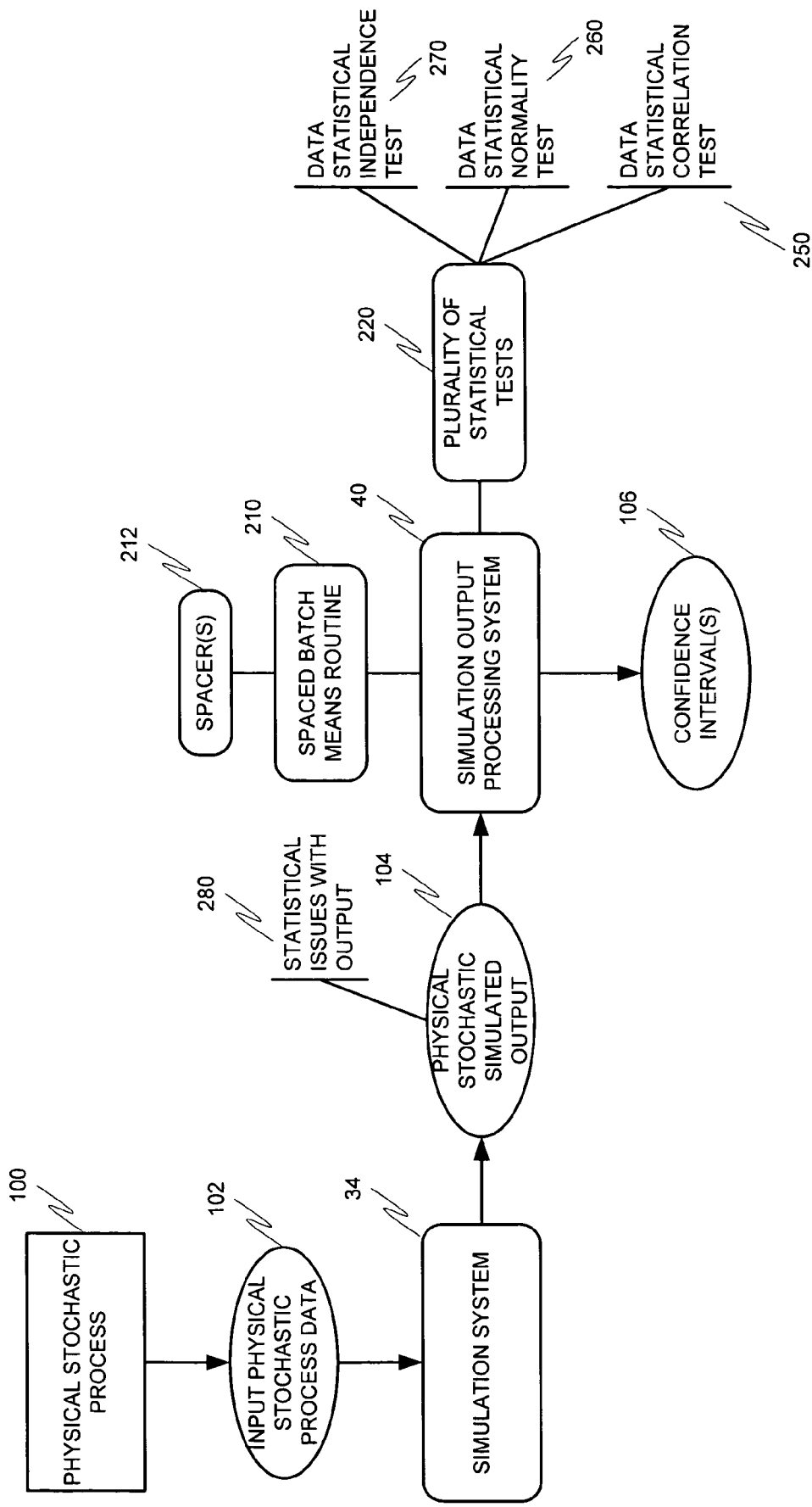

As shown in FIG. 5, other statistical tests can be utilized such as a data statistical normality test 260, a data statistical independence test 270, etc. A test 260 for normality can be used to determine a batch size that is sufficiently large to ensure the spaced batch means are approximately normal. Statistical techniques for computing confidence intervals based on independent and identically distributed normal observations can then be applied to the final set of spaced batch means to compute a confidence interval. As an illustration of a statistical technique, the sample variance of the resulting set of spaced batch means can be used to estimate the variance of the final point estimator of the steady-state mean.

It should be understood that similar to the other processing flows described herein, the steps and the order of the steps of a processing flow described herein may be altered, modified, removed and/or augmented and still achieve the desired outcome. For example, a resulting confidence interval half width (as computed via the final set of spaced batch means) can be inflated by a factor that is based on the lag-one correlation of the spaced batch means. This accounts for any residual correlation that may exist between the spaced batch means.

A data statistical independence test 270 may also be used with respect to the physical stochastic simulated output 104. More specifically, the test 270 can be used in determining an appropriate data truncation point beyond which all computed batch means are approximately independent of the simulation model's initial conditions.

Through use of a plurality of statistical test 220, the simulation output processing system 40 can handle one or more statistical issues 280 that may arise with the physical stochastic simulated output 104. As an illustration, such issues could include highly non-normal, correlated observations (e.g., significant correlation between successive observations), and observations contaminated by initialization bias.

These issues can occur when analyzing stochastic output from a non-terminating simulation because of a number of factors. For example, an analyst may not possess sufficient information to start a simulation in steady-state operation; and thus it is necessary to determine an adequate length for the initial "warm-up" period so that for each simulation output generated after the end of the warm-up period, the corresponding expected value is sufficiently close to the steady-state mean. If observations generated prior to the end of the warm-up period are included in the analysis, then the resulting point estimator of the steady-state mean may be biased; and such bias in the point estimator may severely degrade not only the accuracy of the point estimator but also the probability that the associated confidence interval will cover the steady-state mean.

As another example, a problem may also exist when pronounced stochastic dependencies occur among successive responses generated within a single simulation run. This phenomenon may complicate the construction of a confidence interval for the steady-state mean because standard statistical methods can require independent and identically distributed normal observations to yield a valid confidence interval.

Figure 6:
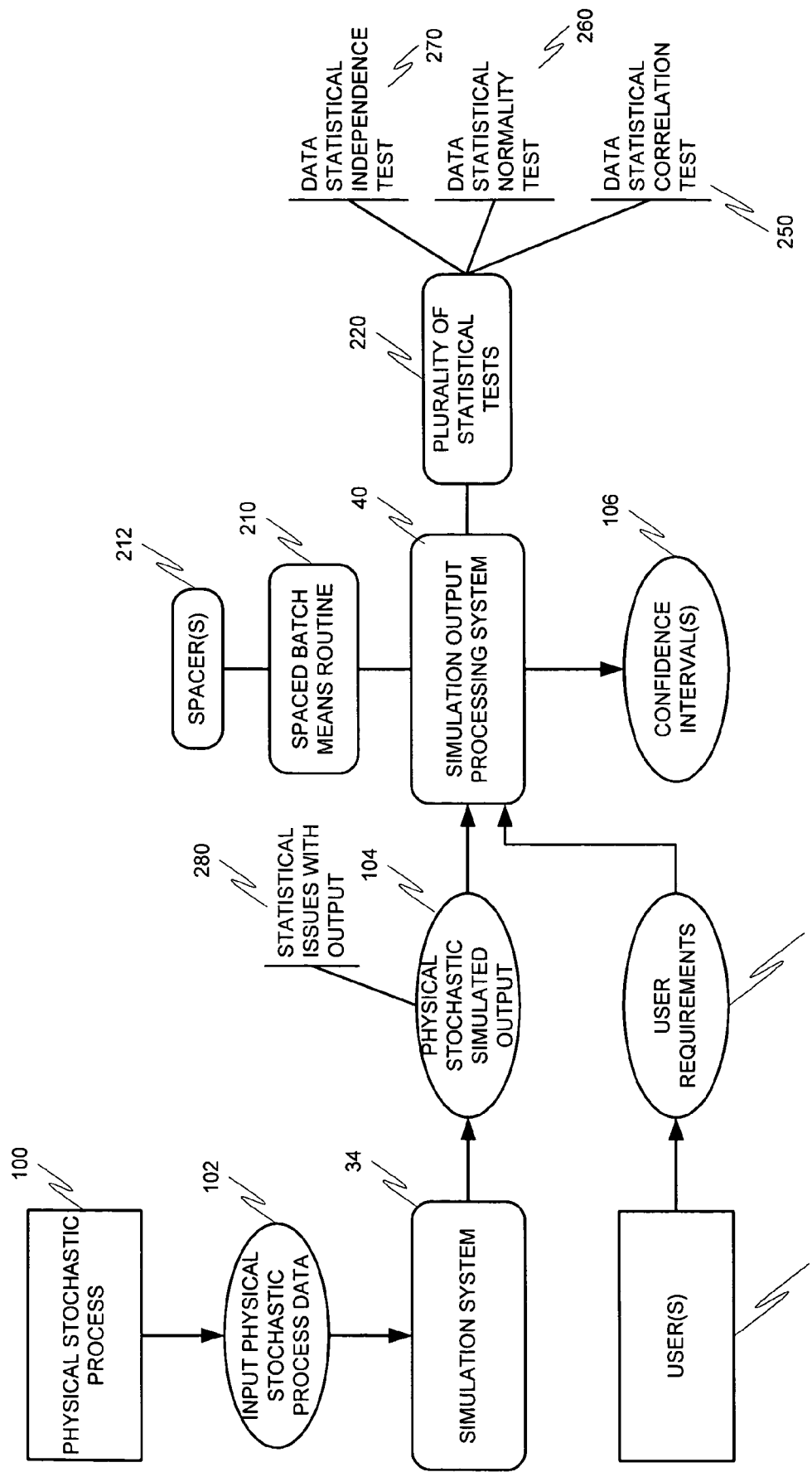
FIG. 6 is a block diagram depicting user requirements being provided to a simulation output processing system.

FIG. 6 illustrates that the simulation output processing system 40 can receive user requirements 310 from one or more users 300. These user requirements 310 can specify what level of precision is needed and/or coverage probability requirements when the simulation output processing system 40 is generating a confidence interval 106. The user requirements 310 provide criteria by which a confidence interval 106 can be considered valid.

As an example, the simulation output processing system 40 can receive such user-supplied inputs as follows:

1. the desired confidence interval coverage probability $1-\beta$, where $0<\beta<1$; and
2. an absolute or relative precision requirement specifying the final confidence interval half-length in terms of a maximum acceptable half-length h* (for an absolute precision requirement) or a maximum acceptable fraction r* of the magnitude of the confidence interval midpoint (for a relative precision requirement).

In this example, the simulation output processing system 40 returns the following outputs:

1. a nominal $100(1-\beta)\%$ confidence interval for the steady-state mean that satisfies the specified precision requirement; or
2. a new, larger sample size that needs to be supplied to the simulation output processing system 40 in order to generate valid confidence intervals.

The simulation output processing system 40 begins by dividing the initial simulation-generated output process 104 $\{X_i: i=1, \ldots, n\}$ of length n=16384 observations into k=1024 batches of size m=16, with a spacer of initial size S=0 preceding each batch. For each batch, a batch mean is computed as follows:

$$\overline{X}_j = \frac{1}{m} \sum_{i=m(j-1)+1}^{mj} X_i \text{ for } j = 1, \ldots, k.$$

The randomness test 270 of von Neumann is then applied to the initial set of batch means (e.g., see Section 4.2 Lada, E. K. and J. R. Wilson (2006), "A wavelet-based spectral procedure for steady-state simulation analysis," European Journal of Operational Research, vol. 174, pages 1769-1801.) for specific details on implementing the von Neumann test). The von Neumann test 270 for randomness can be used to determine an appropriate data truncation point (or end of the warm-up period) beyond which all computed batch means are approximately independent of the simulation model's initial conditions.

If the initial k=1024 adjacent batch means pass the statistical independence (e.g., randomness) test 270, then a statistical normality test 260 can be performed. If, however, the batch means fail the randomness test 270, then a spacer 210 consisting of one ignored batch is inserted between the k'=512 remaining batch means (that is, every other batch mean, beginning with the second, is retained) and the randomness test 270 is repeated on the new set of spaced batch means. Each time the randomness test 270 is failed, a batch is added to a spacer 212 preceding each batch (up to a limit of 14 batches) and then the randomness test 270 is performed again on the new set of spaced batch means. If the number of spaced batch means reaches k'=68 and the batch means still fails the randomness test 270, then the batch size m is increased by a factor of $\sqrt{2}$, the initial sample is rebatched into k=1024 adjacent batches of size m and a new set of k batch means is computed and tested for randomness. This process continues until the randomness test 270 is passed, at which point the observations comprising the first spacer are discarded to account for system warm-up and the resulting set of k' spaced batch means are assumed to be approximately independent and identically distributed.

While these parameter value selections may help increase the sensitivity of the randomness test 270 and the test for normality 260 that is applied to the resulting set of spaced batch means, it should be understood (as here and elsewhere) that different parameter values can be used depending upon the situation at hand.

Once the randomness test 270 is passed, the size of the spacer 212 separating each batch is fixed and the set of spaced batch means is tested for normality via a method 260 such as Shapiro and Wilk (see Section 4.3 of Lada and Wilson (2006)). For iteration i=1 of the normality test 260, the level of significance for the Shapiro-Wilk test is $\alpha_{nor}(1)=0.05$. Each time the normality test 260 is failed, the significance level $\alpha_{nor}(i)$ is decreased according to:

$$\alpha_{nor}(i) = \alpha_{nor}(1)\exp[-0.184206(i-1)^2];$$

The batch size is increased by a factor $\sqrt{2}$ for the first six times the normality test 260 is failed. After that, each time the normality test 260 is failed the batch size is increased according to:

$$m \leftarrow \lfloor 2^{1/(i-4)} m \rfloor \text{ for } i=7, 8,$$

This modification to the batch size inflation factor can be used to balance the need for avoiding gross departures from normality of the batch means and avoiding excessive growth in the batch sizes necessary to ensure approximate normality of the batch means.

After the Shapiro-Wilk test for normality 260 is passed, the lag-one correlation $\hat{\phi}$ of the spaced batch means is tested to ensure $\hat{\phi}$ is not too close to 1. The system applies a correlation test 250 to the approximately normal, spaced batch means (using a 95% upper confidence limit for $\sin^{-1}(\hat{\phi})$). Each time the correlation test 250 is failed, the batch size is increased by the factor 1.1.

Once the correlation test 250 is passed, the correlation-adjusted 100(1-β)% confidence interval 106 for the steady-state mean is then given by:

$$\overline{X} \pm t_{1-\beta/2, k'-1} \sqrt{\frac{A\hat{\sigma}^2}{k'}},$$

where $\overline{X}$ is the average of all observations, including those in the spacers (excluding the first), $\hat{\sigma}^2$ is the sample variance of the spaced batch means, $t_{1-\beta/2,k'-1}$ is the $1-\beta/2$ quantile of Student's t-distribution with k'-1 degrees of freedom, and $A=(1+\hat{\phi})/(1-\hat{\phi})$ is the correlation adjustment to $\hat{\sigma}^2$. The correlation adjustment A is applied to the sample variance $\hat{\sigma}^2$ to account for any residual correlation that may exist between the spaced batch means so that an approximately valid confidence interval for the steady-state mean can be computed.

If the confidence interval 106 satisfies the user-specified precision requirement 310, then the simulation output processing system 40 has completed its processing. Otherwise, the total number of spaced batches of the current batch size that are needed to satisfy the precision requirement is estimated. There is an upper bound of 1024 on the number of spaced batches used in this example. If the estimated number of spaced batches exceeds 1024, then the batch size is increased so that the total sample size is increased appropriately to satisfy the precision requirement and the next iteration of processing by the simulation output processing system 40 is performed.

Figure 7:
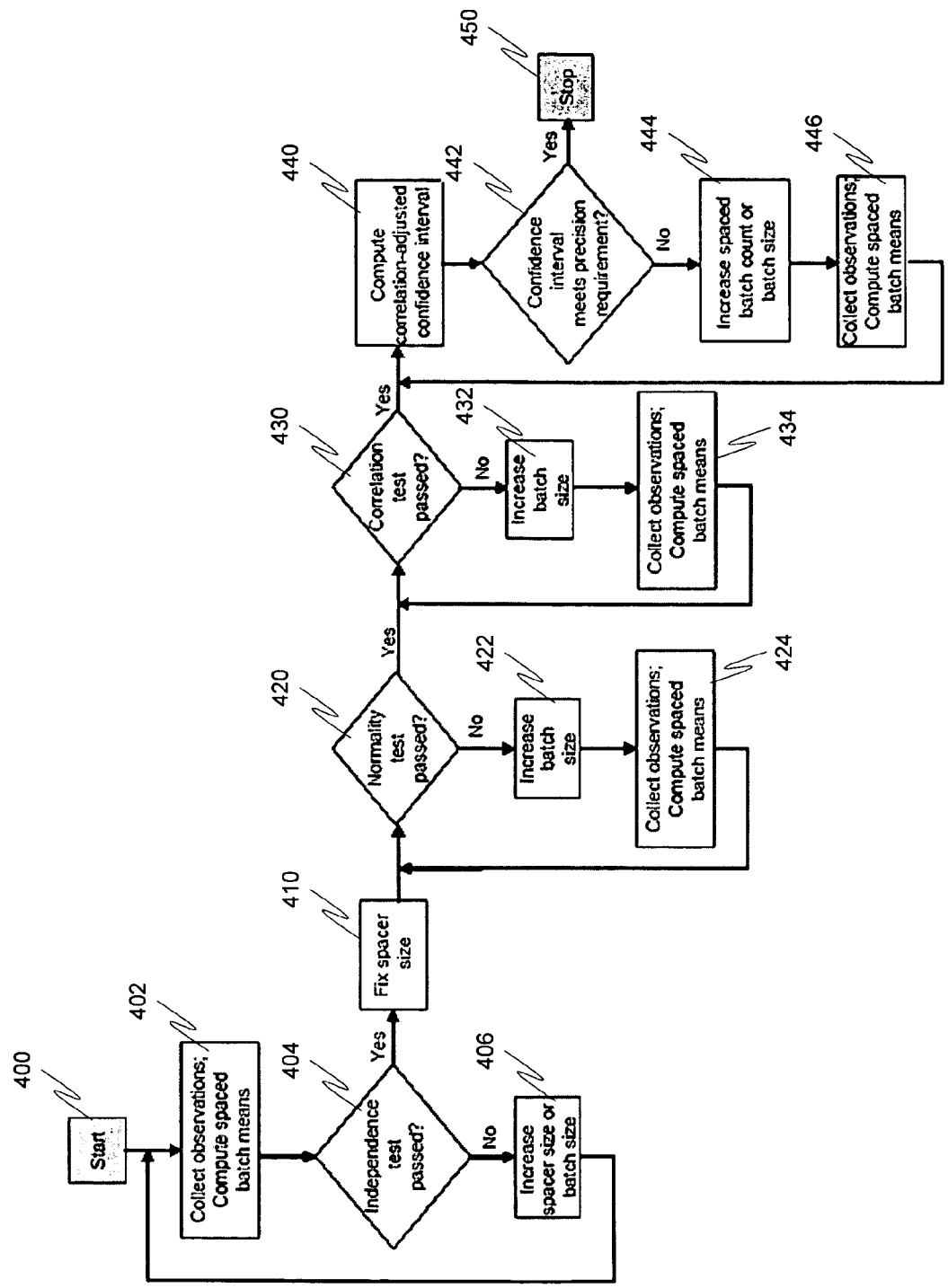
FIG. 7 is a flowchart depicting an operational scenario for the generation of confidence intervals.
Figure 9A:
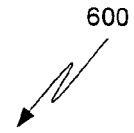
FIGS. 9A-9D illustrate data that has been processed by the system.
Figure 9B:
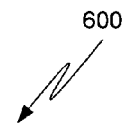
Figure 9C:
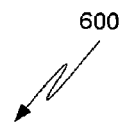
Figure 9D:
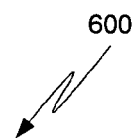

As another illustration, FIG. 7 is an example of an operational scenario wherein a sequential procedure is used in a simulation output processing system 40 to construct an approximately valid confidence interval for the steady-state mean (and/or other relevant statistic) of a simulation-generated output process. Start block 400 indicates that step 402 collects the observations and computes the spaced batch means. At step 402, the initial sample of size n←16384 is divided into k←1024 adjacent (non-spaced) batches of size m←16. The batch means are computed as in Equation (13) of Lada and Wilson (2006). The initial spacer size is set at S←0. The randomness test size is set at $\alpha_{ran}$←0.20. The initial normality test size is set at $\alpha_{nor}$←0.05 and the normality test iteration counter at i←1. The correlation test size is set at $\alpha_{corr}$←0.05.

At step 404, the von Neumann test for randomness is applied to the current set of batch means using the significance level $\alpha_{ran}$. If the randomness test is passed, then at step 410 the number of spaced batch means is set at k'←k and processing continue at step 420, otherwise processing continues at step 406.

At step 406, spacers are inserted each with S←m observations (one ignored batch) between the k'←k/2 remaining batches, and the values of the k' spaced batch means are assigned. Processing continues at step 402 wherein observations are collected and spaced batch means is computed. The randomness test as in Equations (15)-(17) of Lada and Wilson (2006) is applied at step 404 to the current set of k' spaced batch means with significance level $\alpha_{ran}$. If the randomness test is passed, then processing proceeds to step 420 with the spacer size fixed (as indicated at step 410), otherwise processing proceeds back to step 406, wherein another ignored batch is added to each spacer. The spacer size and the batch count are updated as follows:

$$S \leftarrow S+m \text{ and } k' \leftarrow \lfloor n/(m+S) \rfloor;$$

and the values of the k' spaced batch means are reassigned.

If k'≧68, then the randomness test is applied again, and if the test fails again processing continues at step 406. At step 406, the batch size m is increased and the overall sample size n is updated. The spacer size S is reset according to:

$$m \leftarrow \lfloor \sqrt{2m} \rfloor n \leftarrow km, \text{ and } S \leftarrow 0,$$

where k=1024 is the initial (maximum) batch count. The required additional observations are then obtained, and the k adjacent (non-spaced) batch means are recomputed at step 402. Processing would then continue at step 404.

When processing reaches step 420, the Shapiro-Wilk normality test as in Equations (19)-(20) of Lada and Wilson (2006) is applied to the current set of k' spaced batch means using the significance level:

$$\alpha_{nor}(i) \leftarrow \alpha_{nor}(1)\exp[-0.184206(i-1)^2]$$

If the normality test is passed, then execution proceeds to step 430, otherwise processing proceeds to step 422.

At step 422, the normality test iteration counter i, the batch size m, and the overall sample size n are increased according to:

$i \leftarrow i+1$, $m \leftarrow \lfloor 2^{1/(max\{i-4,2\})}m \rfloor$, and $n \leftarrow k'(S+m)$.

The required additional observations are obtained, and the spaced batch means is recomputed using the final spacer size S determined earlier, and processing continues at step 420.

When processing reaches step 430, the sample estimator $\hat{\phi}$ of the lag-one correlation of the spaced batch means is computed. If $$|\hat{\phi}| \le \sin\left[\sin^{-1}(0.8) - \frac{z_{1-\alpha_{corr}}}{\sqrt{k'}}\right],$$

where $z_{1-\alpha_{corr}} = z_{0.95} = 1.96$, then processing continues at step 440, otherwise processing continues at step 432.

At step 432, the batch size m and overall sample size n are increased according to:

$m \leftarrow \lfloor 1.1m \rfloor$ and $n \leftarrow k'(S+m)$.

The required additional observations are obtained, and the spaced batch means is recomputed using the final spacer size S determined earlier, and processing continues at step 430.

When processing reaches step 440, the $\overline{X}$, the grand average of all observations (except the first spacer) is computed. The sample variance $\hat{\sigma}^2$ of the spaced batch means is computed. The sample estimator $\hat{\phi}$ of the lag-one correlation of the spaced batch means and the correlation adjustment to $\hat{\sigma}^2$ are computed as follows:

$$A \leftarrow \frac{1+\hat{\phi}}{1-\hat{\phi}}$$

The correlation-adjusted $100(1-\beta)\%$ confidence interval for $\mu_x$ is computed as follows:

$$\overline{X} \pm t_{1-\beta/2, k'-1} \sqrt{\frac{A\hat{\sigma}^2}{k'}}$$

The appropriate absolute or relative precision stopping rule is then applied at step 442. At step 442, if the half-length $$H \leftarrow t_{1-\beta/2, k'-1} \sqrt{\frac{A\hat{\sigma}^2}{k'}} \quad (1)$$

of the confidence interval satisfies the user-specified precision requirement $$H \le H^*, \quad (2)$$

where $$H^* \leftarrow \begin{cases} \infty, & \text{for no user-specified precision level,} \\ r^*|\overline{X}|, & \text{for a user-specified relative precision level } r^* \\ h^*, & \text{for a user-specified obsolute precision level } h^*, \end{cases}$$

then the confidence interval (as determined via Equation 1) is returned and processing for this operational scenario stops as indicated at indicator 450, otherwise processing proceeds to step 444.

At step 444, the number of batches of the current size is estimated (that will be required to satisfy Equation (2)) as follows:

$k^* \leftarrow \lceil (H/H^*)^2 k' \rceil$.

At step 446, the number of spaced batch means k', the batch size m, and the total sample size n are updated as follows:

$k' \leftarrow \min\{k^*, 1024\}$, $m \leftarrow \lceil (k^*/k')m \rceil$, $n \leftarrow k'(S+m)$.

The additional simulation-generated observations are obtained, and the spaced batch means are recomputed using the final spacer size S. Processing proceeds at step 440. Processing iterates until the confidence interval meets the precision requirement as determined at step 442. Upon that condition, processing for this operational scenario then ends at stop block 450.

FIGS. 8A and 8B depict at 500 processing results from applying a plurality of statistical tests upon sample input data. The figures also depict at the top of FIG. 8A the inputs from the user. The inputs from the user include a precision level at 15% and a confidence level at 10% (thereby generating a nominal 90% confidence interval). The initial data size (e.g. the minimum number of data points) is shown at 16,384. The initial number of batches is 1024, and the initial batch size is 16.

In this example, the normality test has multiple failures at different significance levels because the data is highly non-normal. In response, the significance level is decreased. As shown in FIG. 8B, the processing results in a batch size of 296 after the normality test. It is further shown that the number of batches after the normality test is 256. Note that the first spacer is exactly the same as the first spacer after the independence test is passed.

This figure also illustrates that because the correlation tests has failed, additional data needs to be generated in order to produce valid confidence intervals. This additional data can be generated in many different ways, such as returning back to the steady-state simulator to generate more simulation data on-the-fly.

After the correlation test has passed, the batch size is 325, the number of batches is 256, and the total observations required is 95,488. The bottom of FIG. 8B further shows that the precision test has passed with the resulting confidence interval output data (e.g., confidence interval half width).

FIGS. 9A-9D depict at 600 data that has been processed by the simulation output processing system. Data 600 contains the first 192 observations of the simulated data output after the test for independence has been applied. As noted earlier, the batch size is 16 with a number of batches in the final spacer being 3. The total observations separating each batch mean is 48. The alternating batches are colored in gray in order to distinguish each batch of 16 observations. This pattern continues for the rest of the 16,384 observations that are required to pass the independence test for this data set, given a total of 256 spaced batch means.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the methods and system disclosed herein can provide for efficiency gains (e.g., smaller required sample sizes in order to achieve valid steady-state confidence intervals) as well as robustness against the statistical anomalies commonly encountered in simulation studies.

Figure 10:
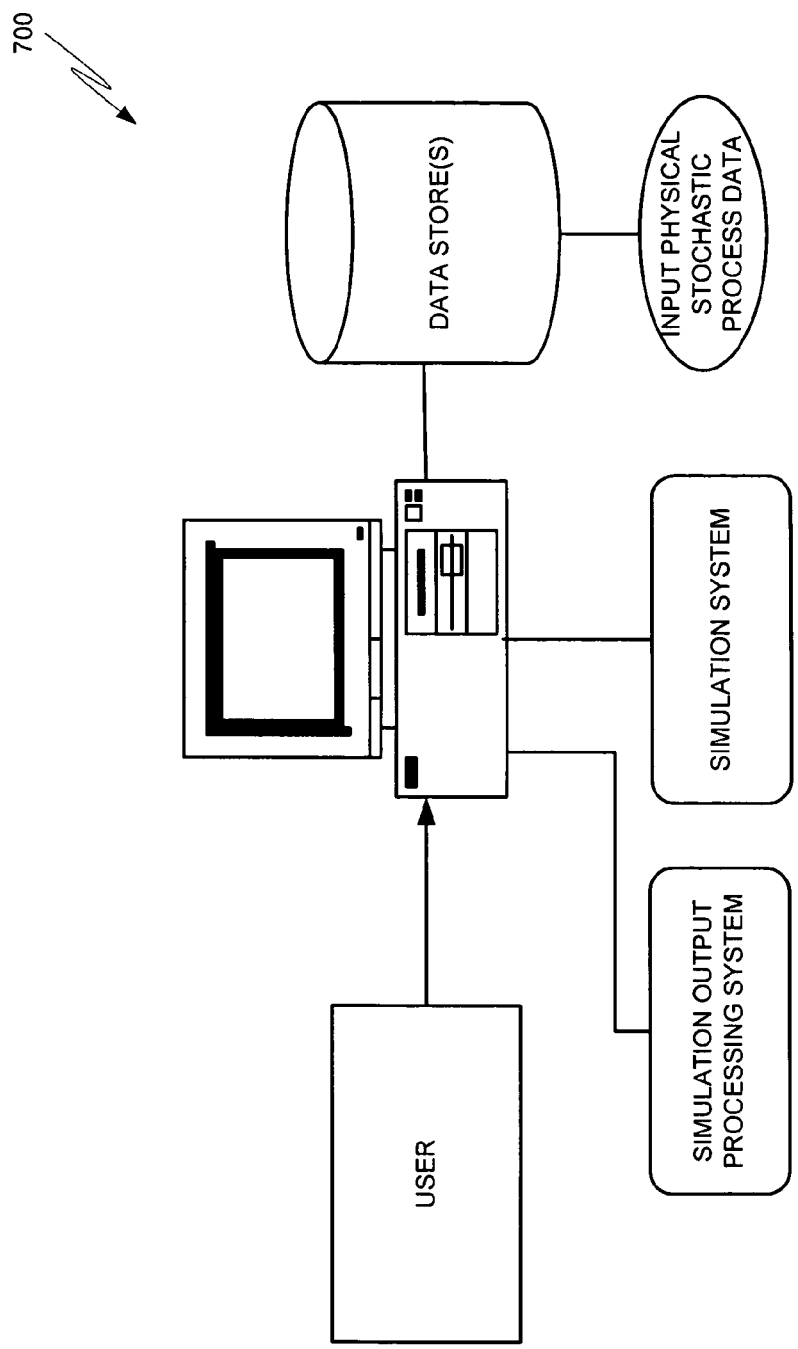
FIG. 10 is a block diagram depicting use of the system upon a general purpose computer.

It is further noted that the systems and methods may be implemented on various types of computer architectures, such as for example on a single general purpose computer or workstation (as shown at 700 on FIG. 10), or on a networked system, and in various configurations (e.g., a client-server configuration, an application service provider configuration, etc.).

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method that estimates confidence intervals for output generated from a computer simulation program that simulates a physical stochastic process, comprising:

executing software instructions on one or more computer processors to receive from the computer simulation program, output that simulates the physical stochastic process, wherein the physical stochastic simulated output includes observations that are non-normal and that exhibit one or more correlations between successive observations;

executing software instructions on the one or more computer processors to compute spaced batch means for the physical stochastic simulated output;

executing software instructions on the one or more computer processors to apply a plurality of statistical tests including a test for correlation of the physical stochastic simulated output, upon the physical stochastic simulated output;

executing software instructions on the one or more computer processors to increase a batch size associated with the physical stochastic simulated output if the test for correlation of the physical stochastic simulated output fails; and executing software instructions on the one or more computer processors to use the increased batch size to determine a confidence interval for the physical stochastic simulated output, wherein the determined confidence interval is provided for analysis of the physical stochastic process.

2. The method of claim 1, wherein the determined confidence interval for the physical stochastic simulated output is a statistically valid confidence interval for steady- state mean of the physical stochastic process.

3. The method of claim 2, wherein the determined statistically valid confidence interval for the steady-state mean satisfies user specified precision and coverage probability requirements.

4. The method of claim 1, wherein the plurality of statistical tests includes a test for normality of the physical stochastic simulated output;

wherein the plurality of statistical tests includes a test for independence of the physical stochastic simulated output.

5. The method of claim 4, further comprising:

executing software instructions on the one or more computer processors to increase a batch size associated with the physical stochastic simulated output if at least one of the plurality of statistical tests fails; and executing software instructions on the one or more computer processors to use the increased batch size to determine a confidence interval for the physical stochastic simulated output.

6. The method of claim 1, wherein the observations exhibit contamination caused by initialization bias or system warm-up.

7. The method of claim 1, further comprising:

executing software instructions on the one or more computer processors to determine a size of a spacer that is composed of ignored observations, that precedes each batch, and that is sufficiently large to ensure the resulting spaced batch means are approximately independent.

8. The method of claim 7, wherein a test for normality is used in determining a batch size that is sufficiently large to ensure the spaced batch means are approximately normal.

9. The method of claim 1, wherein a half width of the determined confidence interval is increased by a factor that is based upon a lag-one correlation of the computed spaced batch means, thereby accounting for any existing residual correlation between the spaced batch means.

10. The method of claim 1, wherein the physical stochastic simulated output from the computer simulation program is generated by performing a probabilistic steady-state simulation.

11. The method of claim 10, wherein the determined confidence interval is provided for analysis of long-run average performance measures associated with the physical stochastic simulated process.

12. The method of claim 1, wherein estimators of the determined confidence interval are for a parameter of a steady-state cumulative distribution function of a simulation-generated response.

13. The method of claim 12, wherein the simulation-generated response is the steady-state mean.

14. Computer-readable medium storing computer-readable instructions, which when executed by a processor, cause a computing device to perform the method of claim 1.

15. Computer software stored on one or more computer readable mediums, the computer software comprising executable program code that performs a method for estimating confidence intervals for output generated from a computer simulation program that simulates a physical stochastic process, the method, comprising:
- receiving, from the computer simulation program, output that simulates the physical stochastic process, wherein the physical stochastic simulated output includes observations that are non-normal and that exhibit one or more correlations between successive observations;
- computing spaced batch means for the physical stochastic simulated output;
- applying a plurality of statistical tests including a test for correlation of the physical stochastic simulated output, upon the physical stochastic simulated output;
- increasing a batch size associated with the physical stochastic simulated output if the test for correlation of the physical stochastic simulated output fails; and
- using the increased batch size to determine a confidence interval for the physical stochastic simulated output, wherein the determined confidence interval is provided for analysis of the physical stochastic process.

16. A computer-implemented system for estimating confidence intervals for output generated from a computer simulation program that simulates a physical stochastic process, comprising:
- a processor;
- a computer-readable storage medium containing software instructions executable on the processor to cause the processor to perform operations including:
  - receiving, from the computer simulation program, output that simulates the physical stochastic process, wherein the physical stochastic simulated output includes observations that are non-normal and that exhibit one or more correlations between successive observations;
  - computing spaced batch means for the physical stochastic simulated output;
  - applying a plurality of statistical tests including a test for correlation of the physical stochastic simulated output, upon the physical stochastic simulated output;
  - increasing a batch size associated with the physical stochastic simulated output if the test for correlation of the physical stochastic simulated output fails; and
  - using the increased batch size to determine a confidence interval for the physical stochastic simulated output, wherein the determined confidence interval is provided for analysis of the physical stochastic process.

17. A computer-implemented method that estimates confidence intervals for output generated from a computer simulation program that simulates a physical stochastic process, comprising:
- executing software instructions on one or more computer processors to receive from the computer simulation program, output that simulates the physical stochastic process;
- executing software instructions on the one or more computer processors to compute spaced batch means for the physical stochastic simulated output;
- executing software instructions on the one or more computer processors to apply a plurality of statistical tests including a test for correlation of the physical stochastic simulated output, upon the physical stochastic simulated output;
- executing software instructions on the one or more computer processors to increase a batch size associated with the physical stochastic simulated output if the test for correlation of the physical stochastic simulated output fails; and
- executing software instructions on the one or more computer processors to use the increased batch size to determine a confidence interval for the physical stochastic simulated output, and
- executing software instructions on the one or more computer processors to increase a half width of the determined confidence interval by a factor based upon a lag-one correlation of the computed spaced batch means, thereby accounting for any existing residual correlation between the spaced batch means.

18. A computer-implemented method that estimates confidence intervals for output generated from a computer simulation program that simulates a physical stochastic process, comprising:
- executing software instructions on one or more computer processors to receive from the computer simulation program, output that simulates the physical stochastic process, wherein the physical stochastic simulated output is generated by performing a probabilistic steady-state simulation;
- executing software instructions on the one or more computer processors to compute spaced batch means for the physical stochastic simulated output;
- executing software instructions on the one or more computer processors to apply a plurality of statistical tests including a test for correlation of the physical stochastic simulated output, upon the physical stochastic simulated output;
- executing software instructions on the one or more computer processors to increase a batch size associated with the physical stochastic simulated output if the test for correlation of the physical stochastic simulated output fails; and
- executing software instructions on the one or more computer processors to use the increased batch size to determine a confidence interval for the physical stochastic simulated output, wherein the determined confidence interval is provided for analysis of long-run average performance measures associated with the physical stochastic simulated process.

19. A computer-implemented method that estimates confidence intervals for output generated from a computer simulation program that simulates a physical stochastic process, comprising:

executing software instructions on one or more computer processors to receive from the computer simulation program, output that simulates the physical stochastic process;

executing software instructions on the one or more computer processors to compute spaced batch means for the physical stochastic simulated output;

executing software instructions on the one or more computer processors to apply a plurality of statistical tests including a test for correlation of the physical stochastic simulated output, upon the physical stochastic simulated output;

executing software instructions on the one or more computer processors to increase a batch size associated with the physical stochastic simulated output if the test for correlation of the physical stochastic simulated output fails; and executing software instructions on the one or more computer processors to use the increased batch size to determine a confidence interval for the physical stochastic simulated output, wherein estimators of the determined confidence interval are for a parameter of a steady-state cumulative distribution function of a simulation-generated response.

20. The method of claim 19, wherein the simulation-generated response is the steady-state mean.

* * * * *